US011262586B2

(12) United States Patent
Kim et al.

(10) Patent No.: US 11,262,586 B2
(45) Date of Patent: Mar. 1, 2022

(54) ELECTRONIC DEVICE AND WEARABLE ELECTRONIC DEVICE

(71) Applicant: Samsung Display Co., Ltd., Yongin-si (KR)

(72) Inventors: Yong Seok Kim, Seoul (KR); JaeJoong Kwon, Suwon-Si (KR); JeongWoo Park, Yongin-si (KR); Soomin Baek, Hwaseong-si (KR); Subin Jung, Incheon (KR); Juhwa Ha, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/923,807

(22) Filed: Jul. 8, 2020

(65) Prior Publication Data

US 2021/0055558 A1   Feb. 25, 2021

(30) Foreign Application Priority Data

Aug. 19, 2019   (KR) .......................... 10-2019-0101320

(51) Int. Cl.
   *G02B 27/01*   (2006.01)
(52) U.S. Cl.
   CPC .. *G02B 27/0172* (2013.01); *G02B 2027/0178* (2013.01)
(58) Field of Classification Search
   USPC .......................................................... 345/8
   See application file for complete search history.

(56) References Cited

U.S. PATENT DOCUMENTS

| 1,688,606 | A | * | 10/1928 | Wright | G02B 27/145 |
| | | | | | 359/629 |
| 10,247,943 | B1 | * | 4/2019 | Yu | G02B 27/0081 |
| 10,459,228 | B1 | * | 10/2019 | Kress | G02B 27/0172 |
| 10,473,926 | B2 | | 11/2019 | Lee et al. | |
| 2004/0076370 | A1 | * | 4/2004 | Xu | G02B 6/29386 |
| | | | | | 385/24 |
| 2004/0125589 | A1 | * | 7/2004 | Sung | G02B 6/0033 |
| | | | | | 362/624 |
| 2006/0132914 | A1 | * | 6/2006 | Weiss | G02B 27/143 |
| | | | | | 359/462 |
| 2011/0050548 | A1 | * | 3/2011 | Blumenfeld | G02B 17/006 |
| | | | | | 345/8 |

(Continued)

FOREIGN PATENT DOCUMENTS

| JP | 2016-045231 | 4/2016 |
| KR | 10-2015-0095342 | 8/2015 |

(Continued)

*Primary Examiner* — Chineyere D Wills-Burns
(74) *Attorney, Agent, or Firm* — H.C. Park & Associates, PLC

(57) ABSTRACT

An electronic device includes: a light transmissive unit including an incidence surface and an emission surface oriented in two different directions, first reflectors disposed on a first surface, and second reflectors disposed on a second surface spaced apart from the first surface; and a display unit disposed adjacent to the incidence surface to direct light toward the first reflectors and the second reflectors; wherein the first reflectors and the second reflectors are offset from each other, when viewed through the incidence surface and the emission surface.

20 Claims, 12 Drawing Sheets

(56) References Cited

U.S. PATENT DOCUMENTS

| | | | |
|---|---|---|---|
| 2012/0002294 A1* | 1/2012 | Dobschal | G02B 27/0172 |
| | | | 359/630 |
| 2012/0062850 A1* | 3/2012 | Travis | G02B 27/0172 |
| | | | 353/31 |
| 2015/0205134 A1* | 7/2015 | Bailey | G02B 27/0172 |
| | | | 345/8 |
| 2015/0226971 A1 | 8/2015 | Kim et al. | |
| 2017/0090197 A1 | 3/2017 | Tsai et al. | |
| 2018/0011322 A1* | 1/2018 | Leighton | G02B 27/0172 |
| 2018/0172981 A1 | 6/2018 | Ishii | |
| 2018/0231832 A1* | 8/2018 | Liu | G02F 1/133528 |
| 2018/0284338 A1* | 10/2018 | Wang | G02B 6/0043 |
| 2019/0025602 A1* | 1/2019 | Qin | G02B 27/286 |
| 2019/0171005 A1 | 6/2019 | Lee et al. | |
| 2020/0064633 A1* | 2/2020 | Maimone | G02B 6/29316 |

FOREIGN PATENT DOCUMENTS

| | | |
|---|---|---|
| KR | 10-2019-0065753 | 6/2019 |
| KR | 20210027557 | 3/2021 |

* cited by examiner

ELECTRONIC DEVICE AND WEARABLE ELECTRONIC DEVICE

CROSS-REFERENCE TO RELATED APPLICATION

This application claims priority from and the benefit of Korean Patent Application No. 10-2019-0101320, filed on Aug. 19, 2019, which is hereby incorporated by reference for all purposes as if fully set forth herein.

BACKGROUND

Field

Exemplary implementations of the invention relate generally to an electronic device, and more particularly to a wearable electronic device.

Discussion of the Background

A wearable electronic device is an electronic device that may be worn on a body of a user, and is used to augment reality or virtual reality technology. A wearable electronic device for augmented reality technology allows a user to see both virtual graphic images and real objects.

The above information disclosed in this Background section is only for understanding of the background of the inventive concepts, and, therefore, it may contain information that does not constitute prior art.

SUMMARY

Electronic devices and wearable electronic devices constructed according to the principles and exemplary implementations of the invention have improved brightness and/or clearer images. For example, reflection patterns may be disposed on a plurality of layers or surfaces. Thus, it may be possible to increase the amount of light reflected by the reflection patterns and thereby to improve the brightness of an image. In addition, since the reflection patterns are disposed on the plurality of layers or surfaces, it may be possible to increase the area of an image-displaying region. Furthermore, even when the size of the reflection patterns is reduced to realize a clear image, the brightness of the image may be compensated by increasing the number of the reflection patterns.

Additional features of the inventive concepts will be set forth in the description which follows, and in part will be apparent from the description, or may be learned by practice of the inventive concepts.

According to one aspect of the invention, an electronic device includes: a light transmissive unit including an incidence surface and an emission surface oriented in two different directions, first reflectors disposed on a first surface, and second reflectors disposed on a second surface spaced apart from the first surface; and a display unit disposed adjacent to the incidence surface to direct light toward the first reflectors and the second reflectors; wherein the first reflectors and the second reflectors are offset from each other, when viewed through the incidence surface and the emission surface.

The light transmissive unit may include a transmission part, the first reflectors may include first reflection patterns, second reflectors may include second reflection patterns, the display unit may include a display part, and distances between the first reflection patterns and the incidence surface may be less than distances between the second reflection patterns and the incidence surface.

The first reflectors may be arranged in a first direction and a second direction intersecting the first direction, the second reflectors may be arranged in the first direction and the second direction, and the second reflectors may not be overlapped with the first reflectors.

The size of the first reflectors may be different from the size of the second reflectors.

The second reflectors may be disposed in a region between the first reflectors, when seen through the incidence surface.

The second reflectors may be disposed below the first reflectors, when seen through the emission surface.

The first and second reflectors may be disposed on a region having a first area A1 when seen through the incidence surface that is smaller than a second area of a region on which the first and second reflectors may be disposed when seen through the emission surface.

The first reflectors may have substantially the same size and the second reflectors may have substantially the same size.

Each of the first reflectors may include first patterns, second patterns, and third patterns, which may be sequentially arranged in a first direction, and the first patterns and the third patterns may have different sizes from the size of the second patterns.

The sizes of the first and third patterns may be larger than the size of the second patterns.

The third reflectors, which may be disposed on a third surface defined in the light transmissive unit, wherein some of the third reflectors may be spaced apart from others with the first and second reflectors disposed therebetween, when seen through the incidence surface.

At least one of the first and second surfaces may include a generally flat surface.

At least one of the first and second surfaces may include a generally curved surface having a finite curvature radius.

The angle between the first surface and the incidence surface may be different from an angle between the second surface and the incidence surface.

Each of the first and second reflectors may include a metallic material.

Each of the first and second reflectors may have a refractive index different from a refractive index of the light transmissive unit.

According to another aspect of the invention, a wearable electronic device includes: a light transmissive unit having a first surface and a second surface spaced apart from the first surface; first reflectors disposed on the first surface; second reflectors disposed on the second surface; a display unit disposed adjacent to the light transmissive unit in a first direction provide light toward the first reflectors and the second reflectors; and a coupler configured to be directly or indirectly supported by a part of a human body, the coupler being connected to the light transmissive unit, wherein the first reflectors and the second reflectors are offset from each other in the first direction.

The light transmissive unit may include a transmission part, the first reflectors may include first reflection patterns, second reflectors may include second reflection patterns, the display unit may include a display part, the coupler may include a wearing part, and first reflection patterns may have a size different from that of the second reflection patterns.

Third reflectors may be disposed on a third surface defined in the light transmissive unit, wherein some of the third reflectors may be spaced apart from others with the first and second reflectors disposed therebetween, in the first direction.

The first reflectors may be disposed in a region between the second reflectors, when viewed in the first direction, and the first reflectors may be spaced apart from the second reflectors, when viewed in a second direction crossing the first direction.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
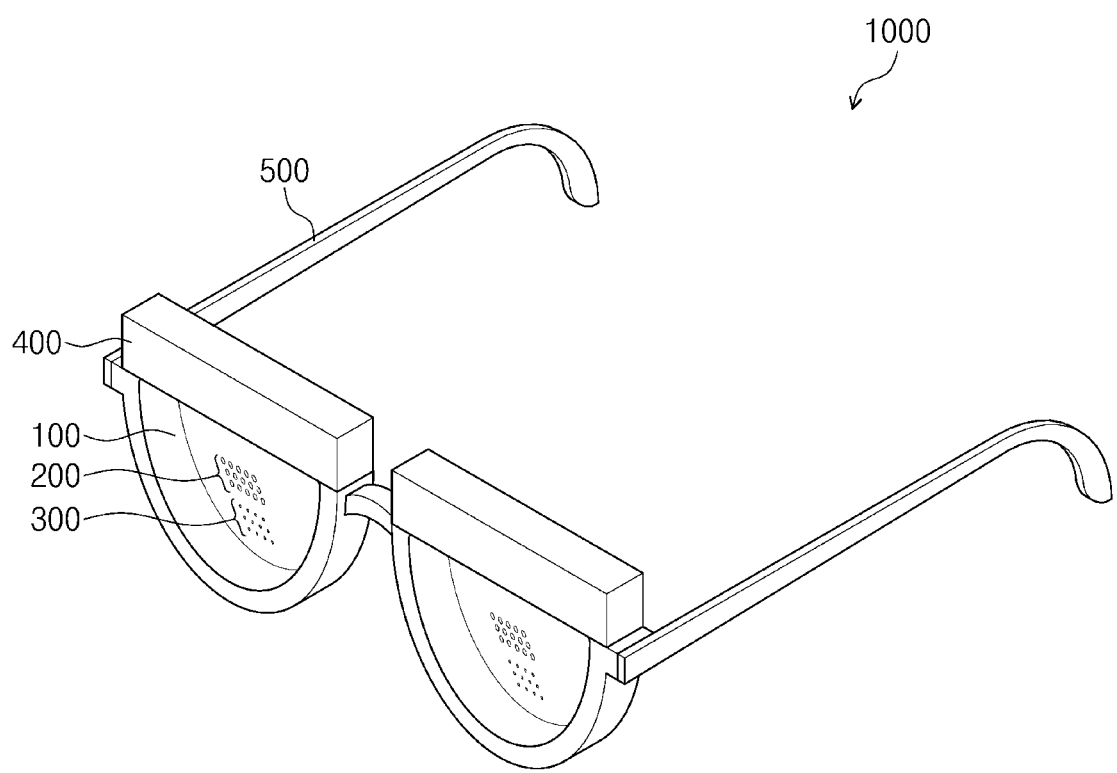
FIG. 1 is a perspective view of an exemplary embodiment illustrating an electronic device constructed according to principles of the invention.
Figure 1:
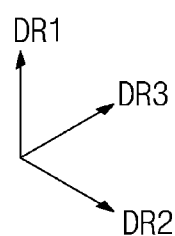

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. Other words used to describe the relationship between elements or layers should be interpreted in a like fashion (e.g., "between" versus "directly between," "adjacent" versus "directly adjacent," "on" versus "directly on"). To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a perspective view of an exemplary embodiment illustrating an electronic device constructed according to principles of the invention.

Referring to FIG. 1, the electronic device 1000 may be configured to output an image. For example, the image may be an image of an object in an augmented or virtual reality game or environment. The electronic device 1000 may be configured to allow a user to see a real object in the real world as well as a virtual image provided from the electronic device 1000.

The electronic device 1000 may be a wearable electronic device. FIG. 1 illustrates an example, in which the electronic device 1000 has the typical shape of glasses. However, the shape of the electronic device 1000 is not limited to this example. For example, the electronic device 1000 may be provided as a part of various wearable products, such as helmets or sports goggles, or any other product that may be supported by a part of human body.

The electronic device 1000 may include a light transmissive unit in the form of a transmission part 100, a first reflector in the form of first reflection patterns 200, a second reflector in the form of second reflection patterns 300, a display unit in the form of a display part 400, and a coupler in the form of a wearing part 500.

The transmission part 100 may be formed of or include a material that is transparent to visible light. This may make it possible to allow a user to see a real object through the transmission part 100. The transmission part 100 may be formed of or include at least one of a glass or one or more synthetic resins, but the material for the transmission part 100 is not limited to this example. In some exemplary embodiments, the electronic device 1000 may include a pair of transmission parts 100, but in other exemplary embodiments, the electronic device 1000 may be configured to have just one transmission part 100.

The first reflection patterns 200 and the second reflection patterns 300 may be disposed in the transmission part 100. The first reflection patterns 200 and the second reflection patterns 300 may include an optically reflective material. The first and second reflection patterns 200 and 300 may include at least one of a metal or a metallic material. For example, the first reflection patterns 200 and the second reflection patterns 300 may include metals (e.g., gold, silver, aluminum) or alloys of the metals. In the illustrated exemplary embodiment, the first reflection patterns 200 and the second reflection patterns 300 may include a material, whose refractive index is different from that of the transmission part 100. In this case, light, which propagates toward the first reflection patterns 200 and the second reflection patterns 300, may be reflected toward a user (e.g., through the total reflection).

The display part 400 may be disposed near a portion of the transmission part 100. For example, the display part 400 may be disposed on the transmission part 100, and in at least one exemplary embodiment, the display part 400 may be disposed adjacent to the transmission part 100 in a first direction DR1. The transmission part 100 may include a surface facing a user, and here, the surface may be substantially parallel to the first direction DR1 and a second direction DR2 intersecting the first direction DR1 at a right angle.

The first reflection patterns 200 and the second reflection patterns 300 may be arranged on a surface, which is a part of the surface of the transmission part 100 and is inclined relative to the display part 400.

The display part 400 may be configured to provide light to the first reflection patterns 200 and the second reflection patterns 300. The first reflection patterns 200 and the second reflection patterns 300 may reflect the light, which is provided from the display part 400, toward a third direction DR3, which may intersect both of the first and second directions DR1 and DR2 at a right angle. The reflected light may constitute a part of an image to be provided to the user.

The wearing part 500 may be combined with the transmission part 100 and the display part 400. In some exemplary embodiments, the wearing part 500 and the display part 400 may be integrated to form a single object. The wearing part 500 may have a structure configured to be supported by a body part or clothing that allows a user to wear it. For example, the wearing part 500 may have a shape similar to the glasses with temples and earpieces/temple tips to wrap around a portion of the wearer's ears.

A driving part to drive the display part 400 may be further disposed in the wearing part 500. In addition, an additional electronic module (e.g., a camera) may be attached to the wearing part 500.

In some exemplary embodiments, the electronic device 1000 may be configured to provide the virtual image to the user in a monocular or binocular manner. However, the exemplary embodiments are not limited thereto. For example, in a monocular embodiment, the display part 400 may be solely provided on the transmission part 100 corresponding to one of two eyes of the user. In this case, the first reflection patterns 200 and the second reflection patterns 300 may be omitted from the transmission part on which the display part 400 is not disposed.

Figure 2:
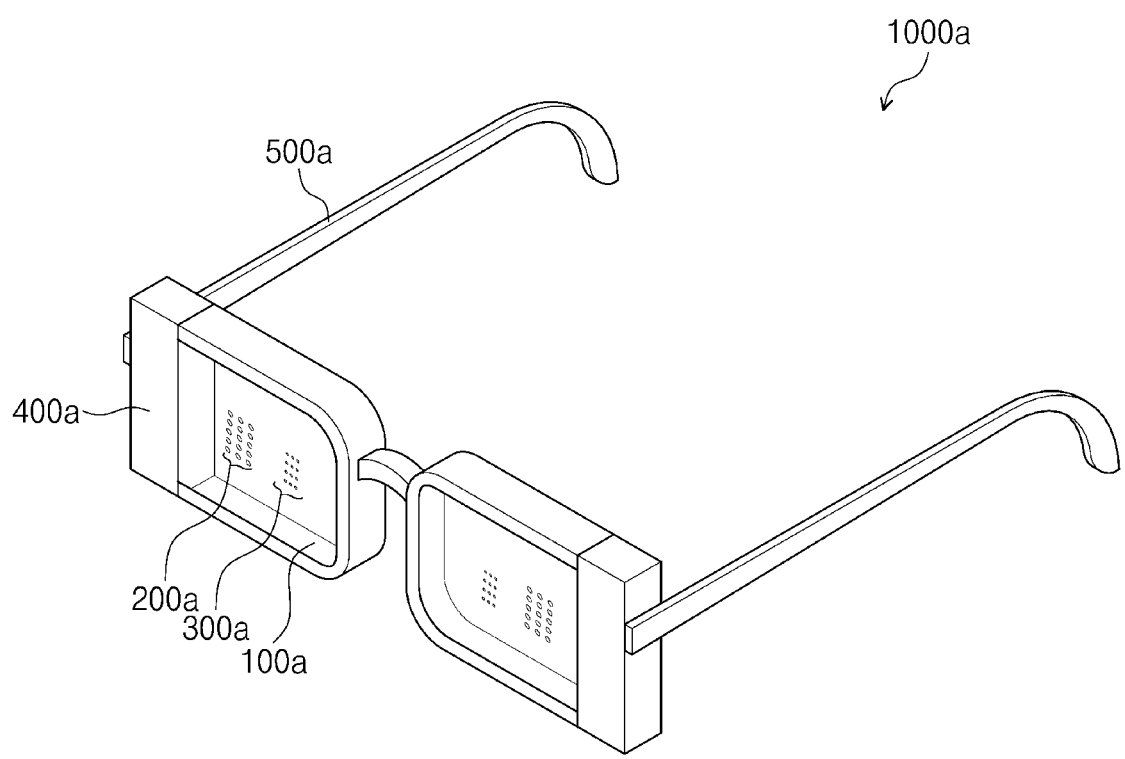
FIG. 2 is a perspective view of another exemplary embodiment illustrating an electronic device constructed according to principles of the invention.
Figure 2:
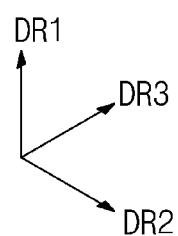

FIG. 2 is a perspective view of another exemplary embodiment illustrating an electronic device constructed according to principles of the invention.

Referring to FIG. 2, the electronic device 1000a may include a transmission part 100a, first reflection patterns 200a, second reflection patterns 300a, a display part 400a, and a wearing part 500a.

The display part 400a may be disposed near a portion of the transmission part 100a. For example, the display part 400a may be disposed on a side surface of the transmission part 100a, and in some exemplary embodiments, the display part 400a may be adjacent to the transmission part 100a in the second direction DR2. However, the position of the display part 400 or 400a may be variously changed from that described with reference to FIGS. 1 and 2.

Figure 3:
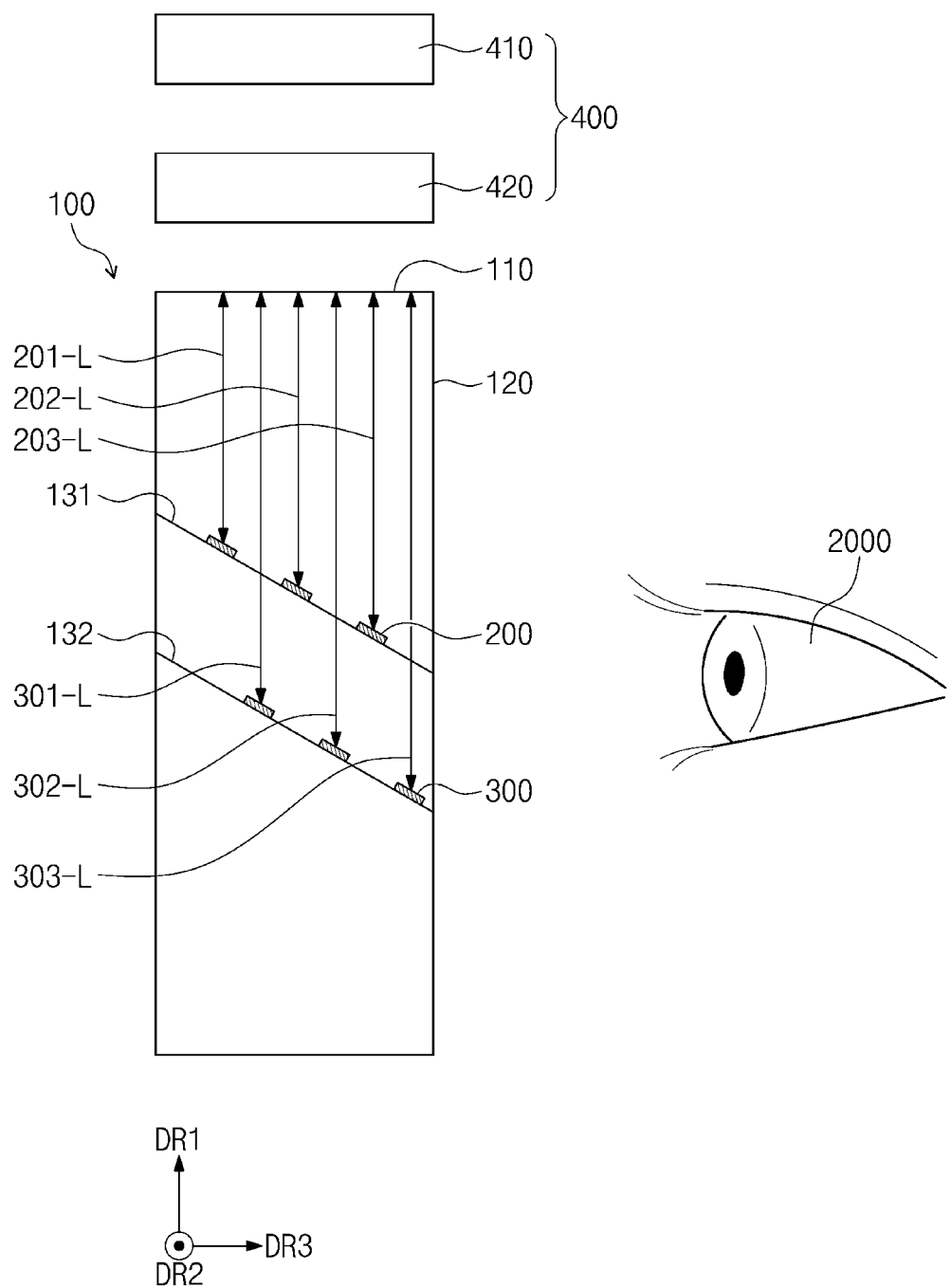
FIG. 3 is a cross-sectional view schematically illustrating the transmission part of an electronic device constructed according to principles of the invention.

FIG. 3 is a cross-sectional view schematically illustrating the transmission part of an electronic device constructed according to principles of the invention.

Referring to FIG. 3, the transmission part 100 may include an incidence surface 110 and an emission surface 120, which is not parallel to the incidence surface 110. The emission surface 120 may be provided to face an eyeball 2000 of a user. For example, the incidence surface 110 may be substantially parallel to a plane defined by the second and third directions DR2 and DR3, and the emission surface 120 may be substantially parallel to a plane defined by the first and second directions DR1 and DR2.

A first surface 131 and a second surface 132 may be defined in the transmission part 100. The first surface 131 and the second surface 132 may be spaced apart from each other. Both of the first surface 131 and the second surface 132 may be inclined relative to the incidence surface 110 by the same or different angles.

The reflection patterns 200 and 300 may include the first reflection patterns 200 and the second reflection patterns 300. The first reflection patterns 200 may be disposed on the first surface 131, and the second reflection patterns 300 may be disposed on the second surface 132. Each of the first and second surfaces 131 and 132 may be a real surface in the real world. Hereinafter, an imaginary surface, on which the first reflection patterns 200 are disposed, will be referred to as the first surface 131, and an imaginary surface, on which the second reflection patterns 300 are disposed, will be referred to as the second surface 132.

The shortest distance between the first surface 131 and the incidence surface 110 may be less than the shortest distance between the second surface 132 and the incidence surface 110. In addition, the largest distance between the first surface 131 and the incidence surface 110 may be less than the shortest distance between the second surface 132 and the incidence surface 110. In this illustrated exemplary embodiment, all of distances 201-L, 202-L, and 203-L between the first reflection patterns 200 and the incidence surface 110 may be less than all of distances 301-L, 302-L, and 303-L between the second reflection patterns 300 and the incidence surface 110. Thus, the first reflection patterns 200 and the second reflection patterns 300 may be offset from each other, e.g. partially or completely non-overlapping when viewed through the emission surface 120. FIG. 3 illustrates an embodiment where the first and second reflection patterns are completely non-overlapping In the case where, unlike the illustrated exemplary embodiments of the invention, the reflection patterns 200 and 300 are disposed on the same surface, the more reflection patterns 200 and 300 provided, the thicker the transmission part 100. This may lead to an increase in weight of the electronic device 1000 of FIG. 1. According to some exemplary embodiments, the reflection patterns 200 and 300 may be disposed on a plurality of surfaces or layers. This may make it possible to increase the number of the reflection patterns 200 and 300 disposed in the transmission part 100, without an increase in thickness of the transmission part 100. Thus, it may be possible to increase the amount of light reflected by the reflection patterns 200 and 300 and thereby to increase the brightness of the image. Furthermore, in some exemplary embodiments where the brightness of the image is increased, it may be possible to reduce the size of each of the reflection patterns 200 and 300. If the sizes of the reflection patterns 200 and 300 are reduced, a user can see the virtual image more clearly due to the pin hole effect.

The display part 400 may face the incidence surface 110. The display part 400 may include a display panel 410 and an optical part 420. The display panel 410 may provide light, which constitutes the image, to the optical part 420. The optical part 420 may be configured to control the path of the light provided from the display panel 410. The optical part 420 may include a concave lens, a convex lens, or combinations of the convex and concave lenses. In some exemplary embodiments, the optical part 420 may be omitted. In certain exemplary embodiments, the optical part 420 and the display panel 410 may be provided as a single member.

Figure 4:
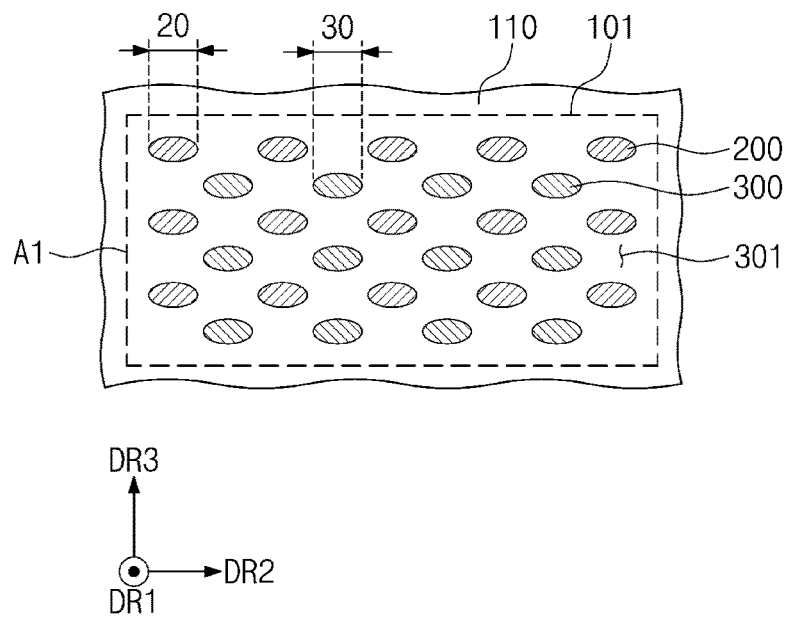
FIG. 4 is a plan view illustrating an exemplary embodiment of first and second reflection patterns, which are seen through the incidence surface of the electronic device of FIG. 3.

FIG. 4 is a plan view illustrating an exemplary embodiment of first and second reflection patterns, which are seen through the incidence surface of the electronic device of FIG. 3.

FIG. 4 illustrates the first and second reflection patterns 200 and 300, which are seen through the incidence surface 110. Hereinafter, an exemplary arrangement of the first and second reflection patterns 200 and 300, which are seen through the incidence surface 110, will be described in more detail with reference to FIG. 4.

The first reflection patterns 200 and the second reflection patterns 300 may be completely non-overlapped with each other. The first reflection patterns 200 and the second reflection patterns 300 may be spaced apart from each other.

The first reflection patterns 200 may be arranged to be spaced apart from each other in the second and third directions DR2 and DR3, and the second reflection patterns 300 may also be arranged to be spaced apart from each other in the second and third directions DR2 and DR3. FIG. 4 illustrates an example, in which fifteen first reflection patterns 200 and twelve second reflection patterns 300 are provided, but the number of the first and second reflection patterns 200 and 300 is not limited to this example.

The second reflection patterns 300 may be disposed, e.g., in a row, in a space 301 between the first reflection patterns 200. For example, the first reflection patterns 200 and the second reflection patterns 300 may be alternately arranged in a first region 101. The first region 101 may be a region, which is defined by a border enclosing the outermost reflection patterns of the first and second reflection patterns 200 and 300. The region 101 may also correspond to an area A1 in FIG. 4.

Each of the first and second reflection patterns 200 and 300 may have a generally circular or generally elliptical shape. However, the exemplary embodiments are not limited to this example. For example, each or at least one of the first and second reflection patterns 200 and 300 may have generally a polygonal shape, and the shape of the first reflection patterns 200 may be different from the shape of the second reflection patterns 300. In some exemplary embodiments, the size of the first reflection patterns 200 may be substantially equal to the size of the second reflection patterns 300. The first reflection patterns 200 may have a first diameter 20, and the second reflection patterns 300 may a second diameter 30 that is equal to the first diameter 20. For example, the first and second diameters 20 and 30 may range from about 0.1 mm to about 2 mm.

The smaller the first and second diameters 20 and 30, the smaller the amount of light reflected from the first and second reflection patterns 200 and 300. However, the reduction of the first and second diameters 20 and 30 may allow a user to see the virtual image more clearly, due to the pin hole effect. The larger the first and second diameters 20 and 30, the more obscure the image provided from the display part 400. However, the increase of the first and second diameters 20 and 30 may increase the amount of light reflected from the first and second reflection patterns 200 and 300, and this may make it possible to improve the brightness property of the image. According to some exemplary embodiments, the first and second diameters 20 and 30 may be selected in consideration of the effects described above.

Figure 5:
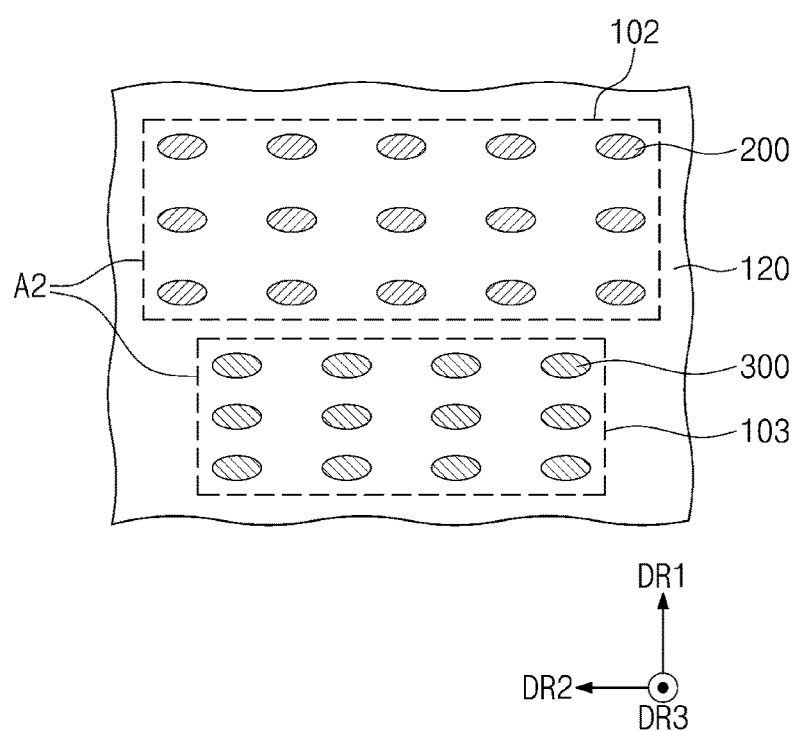
FIG. 5 is a plan view illustrating another exemplary embodiment of the first and second reflection patterns, which are seen through the emission surface of the electronic device of FIG. 3.

FIG. 5 is a plan view illustrating another exemplary embodiment of the first and second reflection patterns, which are seen through the emission surface of the electronic device of FIG. 3.

FIG. 5 illustrates the first and second reflection patterns 200 and 300, which are seen through the emission surface 120. Hereinafter, an exemplary arrangement of the first and second reflection patterns 200 and 300, which are seen through the emission surface 120, will be described in more detail with reference to FIG. 5.

The first reflection patterns 200 and the second reflection patterns 300 may be completely non-overlapped with each other. The first reflection patterns 200 and the second reflection patterns 300 may be spaced apart from each other. The first reflection patterns 200 may be arranged to be spaced apart from each other in the second and third directions DR2 and DR3, and the second reflection patterns 300 may also be arranged to be spaced apart from each other in the second and third directions DR2 and DR3.

All of the first reflection patterns 200 may be spaced apart from all of the second reflection patterns 300 in the first direction DR1. For example, a second region 102 provided with the first reflection patterns 200 may be adjacent to a third region 103 provided with the second reflection patterns 300, in the first direction DR1, but the second and third regions may be completely non-overlapped with each other.

The second region 102 may be a region, which is defined by a border enclosing the outermost patterns of the first reflection patterns 200. The third region 103 may be a region, which is defined by a border enclosing the outermost patterns of the second reflection patterns 300. The sum of the area of the second region 102 and the area of the third region 103 may be greater than the area of the first region 101 described with reference to FIG. 4. In other words, the area A1 of the region 101 may be smaller than the sum of the areas A2 of the regions 102 and 103.

According to some exemplary embodiments, the density of the first and second reflection patterns 200 and 300 viewed through the emission surface 120 may be lower than the density of the first and second reflection patterns 200 and 300 viewed through the incidence surface 110. Thus, a user may easily see a real object through a region between the first reflection patterns 200 and the second reflection patterns 300.

Figure 6:
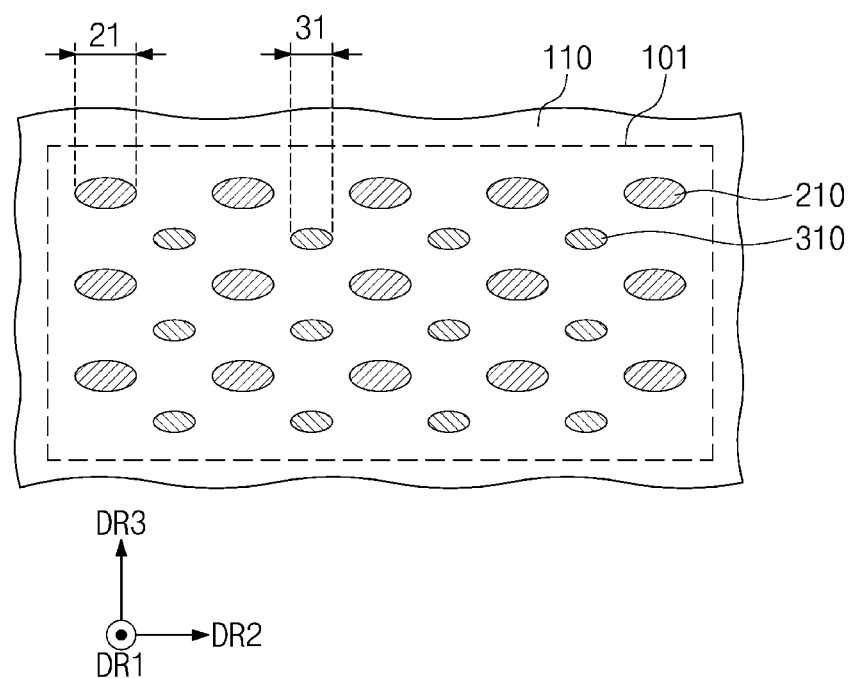
FIG. 6 is a plan view of another exemplary embodiment of first and second reflection patterns of an electronic device constructed according to principles of the invention.

FIG. 6 is a plan view of another exemplary embodiment of first and second reflection patterns of an electronic device constructed according to principles of the invention.

FIG. 6 illustrates first reflection patterns 210 and second reflection patterns 310, which are seen through the incidence surface 110. Hereinafter, an exemplary arrangement of the first reflection patterns 210 and the second reflection patterns 310, which are seen through the incidence surface 110, will be described in more detail with reference to FIG. 6.

Referring to FIG. 6, the size of the first reflection pattern 210 may be different from the size of the second reflection pattern 310. For example, the first diameter 21 of the first reflection patterns 210 may be larger than the second diameter 31 of the second reflection patterns 310. When seen through the incidence surface 110, the second reflection patterns 310 may be recognized through a region between the first reflection patterns 210. In other words, by adjusting the sizes of the first and second reflection patterns 210 and 310, the first reflection patterns 210 may not overlap the second reflection patterns 310. Thus, the first reflection patterns 210 and the second reflection patterns 310 may receive light from the display part 400 (e.g., see FIG. 1).

Figure 7:
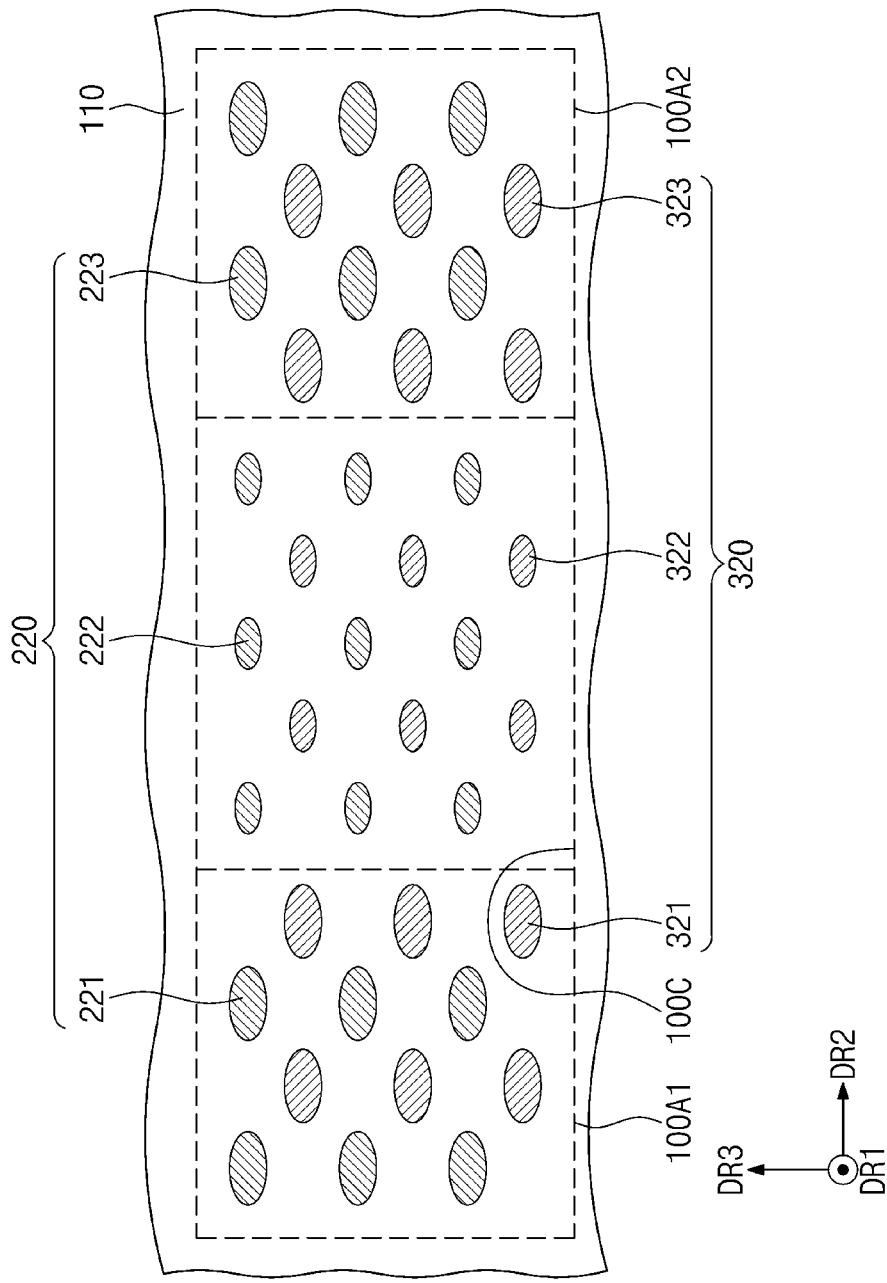
FIG. 7 is a plan view of yet another exemplary embodiment of first and second reflection patterns of an electronic device constructed according to principles of the invention.

FIG. 7 is a plan view of yet another exemplary embodiment of first and second reflection patterns of an electronic device constructed according to principles of the invention.

FIG. 7 illustrates first reflection patterns 220 and second reflection patterns 320, which are seen through the incidence surface 110. Hereinafter, an exemplary arrangement of the first reflection patterns 220 and the second reflection patterns 320, which are seen through the incidence surface 110, will be described in more detail with reference to FIG. 7.

Referring to FIG. 7, the first reflection patterns 220 may include first patterns 221, second patterns 222, and third patterns 223. The second reflection patterns 320 may include fourth patterns 321, fifth patterns 322, and sixth patterns 323.

The first patterns 221, the second patterns 222, and the third patterns 223 may be sequentially arranged in the second direction DR2, and the fourth patterns 321, the fifth patterns 322, and the sixth patterns 323 may be sequentially arranged in the second direction DR2. The first patterns 221 and the third patterns 223 may be spaced apart from each other with the second patterns 222 interposed therebetween, and the fourth patterns 321 and the sixth patterns 323 may be spaced apart from each other with the fifth patterns 322 interposed therebetween. For example, a first outer region 100A1, a center region 100C, and a second outer region 100A2 may be sequentially defined in the incidence surface 110 in the second direction DR2. The first patterns 221 and the fourth patterns 321 may be disposed in the first outer region 100A1, the second patterns 222 and the fifth patterns 322 may be disposed in the center region 100C, and the third patterns 223 and the sixth patterns 323 may be disposed in the second outer region 100A2.

The size of the first patterns 221 may be substantially the same as the size of the third patterns 223 and may be larger than the size of the second patterns 222. Also, the size of the fourth patterns 321 may be substantially the same as the size of the sixth patterns 323 and may be larger than the size of the fifth patterns 322.

As shown in FIG. 3, the display part 400 may include the optical part 420. The spherical aberration phenomenon may occur due to the lens in the optical part 420. According to some exemplary embodiments, by adjusting the sizes of the first reflection patterns 220 and the sizes of the second reflection patterns 320, it may be possible to compensate for distortion of an image caused by the spherical aberration phenomenon. For example, the size of an image output from the display panel 410 (e.g., see FIG. 3) may be smaller in the outer regions than in the center region. In this case, the first patterns 221, the third patterns 223, the fourth patterns 321, and the sixth patterns 323 disposed in the outer regions 100A1 and 100A2 may be designed to have a larger size than the second patterns 222 and the fifth patterns 322 disposed in the center region 100C to prevent the image distortion issue.

Figure 8:
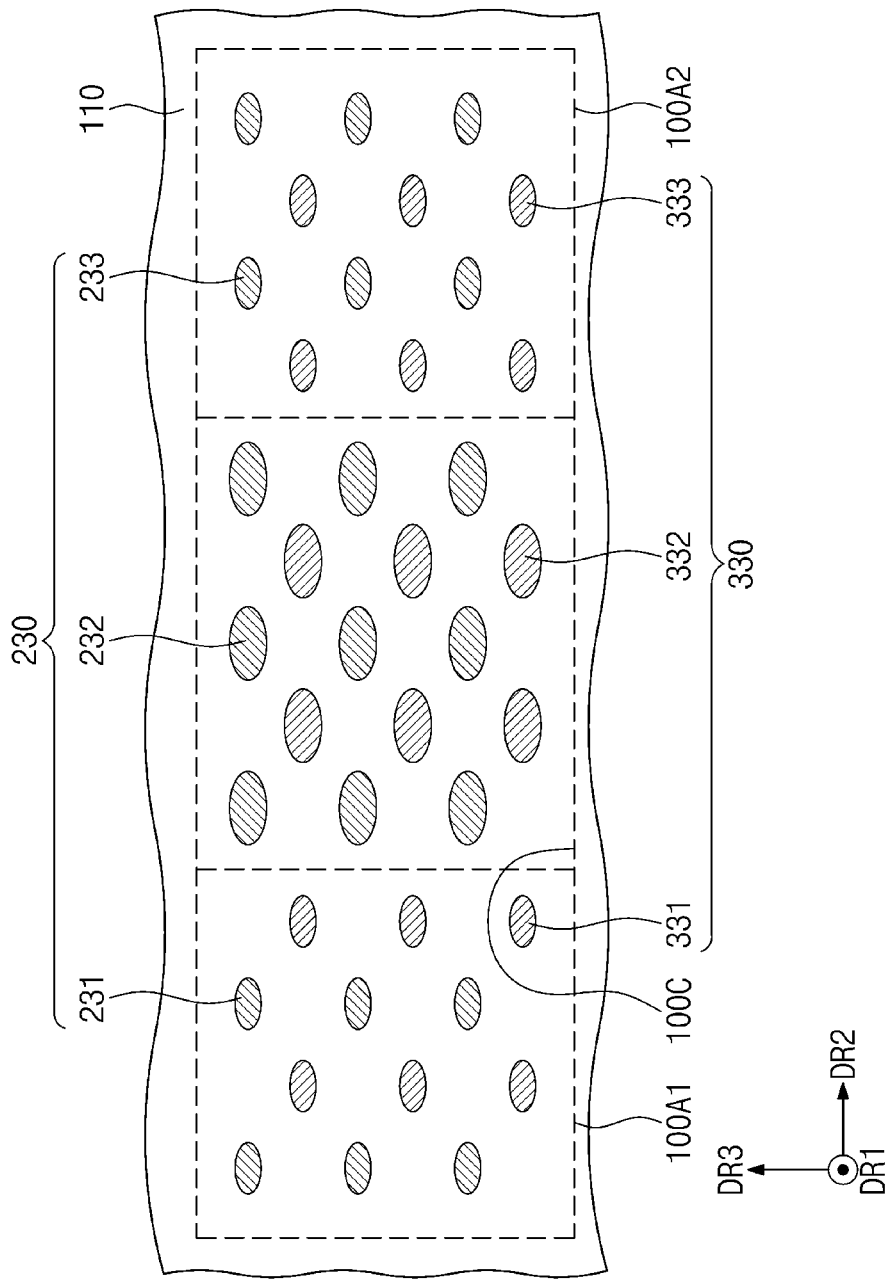
FIG. 8 is a plan view of still another exemplary embodiment of first and second reflection patterns of an electronic device constructed according to principles of the invention.

FIG. 8 is a plan view of still another exemplary embodiment of first and second reflection patterns of an electronic device constructed according to principles of the invention.

FIG. 8 illustrates first reflection patterns 230 and second reflection patterns 330, which are seen through the incidence surface 110. Hereinafter, an exemplary arrangement of the first reflection patterns 230 and the second reflection patterns 330, which are seen through the incidence surface 110, will be described in more detail with reference to FIG. 8.

Referring to FIG. 8, the first reflection patterns 230 may include first patterns 231, second patterns 232, and third patterns 233. The second reflection patterns 330 may include fourth patterns 331, fifth patterns 332, and sixth patterns 333.

The first patterns 231 and the third patterns 233 may be spaced apart from each other with the second patterns 232 interposed therebetween, and the fourth patterns 331 and the sixth patterns 333 may be spaced apart from each other with the fifth patterns 332 interposed therebetween.

The size of the first patterns 231 may be substantially the same as the size of the third patterns 233 and may be smaller than the size of the second patterns 232. Also, the size of the fourth patterns 331 may be substantially the same as the size of the sixth patterns 333 and may be smaller than the size of the fifth patterns 332.

The size of an image output from the display part 400 (e.g., see FIG. 3) may be larger in the outer regions than in the center region. In this case, the first patterns 231, the third patterns 233, the fourth patterns 331, and the sixth patterns 333 disposed in the outer regions may be designed to have a smaller size than the second patterns 232 and the fifth patterns 332 disposed in the center region to prevent the image distortion issue.

Figure 9:
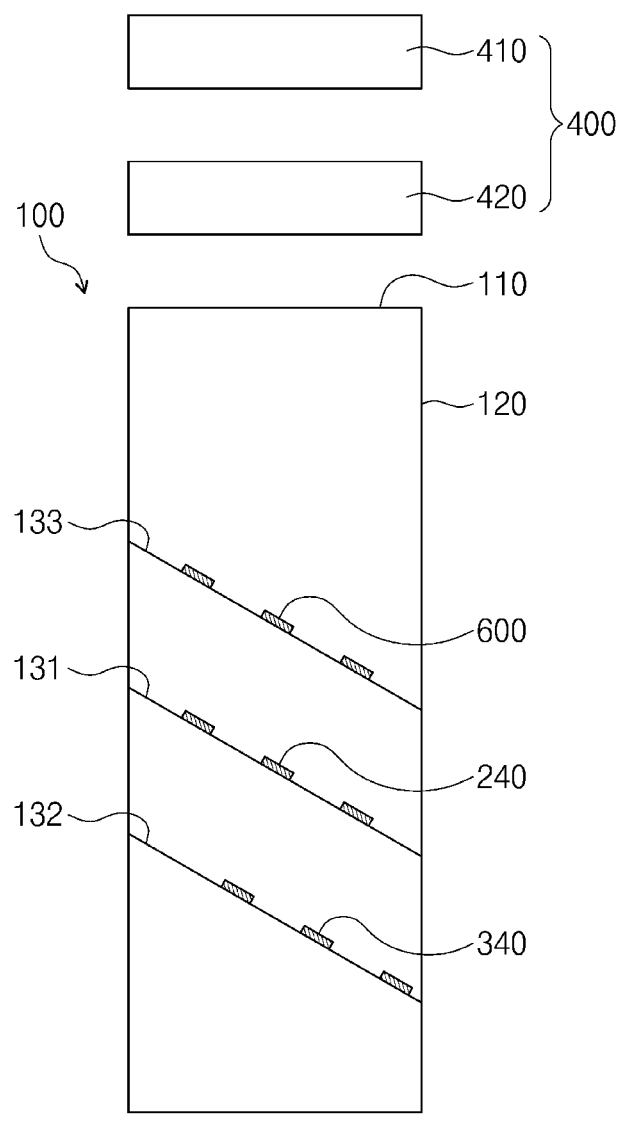
FIG. 9 is a cross-sectional view of a further exemplary embodiment schematically illustrating an electronic device constructed according to principles of the invention.
Figure 9:
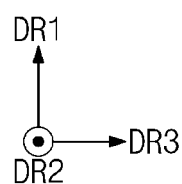

FIG. 9 is a cross-sectional view of a further exemplary embodiment schematically illustrating an electronic device constructed according to principles of the invention.

Referring to FIG. 9, the first surface 131, the second surface 132, and a third surface 133 may be defined in the transmission part 100. The first surface 131, the second surface 132, and the third surface 133 may be spaced apart from each other. All of the first surface 131, the second surface 132, and the third surface 133 may be inclined to the incidence surface 110 at the same or different angles. Furthermore, all of the first surface 131, the second surface 132, and the third surface 133 may be spaced apart from the incidence surface 110. For example, the third surface 133, the first surface 131, and the second surface 132 may be sequentially disposed in a direction away from the incidence surface 110.

First reflection patterns 240 may be disposed on the first surface 131, second reflection patterns 340 may be disposed on the second surface 132, and third reflection patterns 600 may be disposed on the third surface 133.

Figure 10:
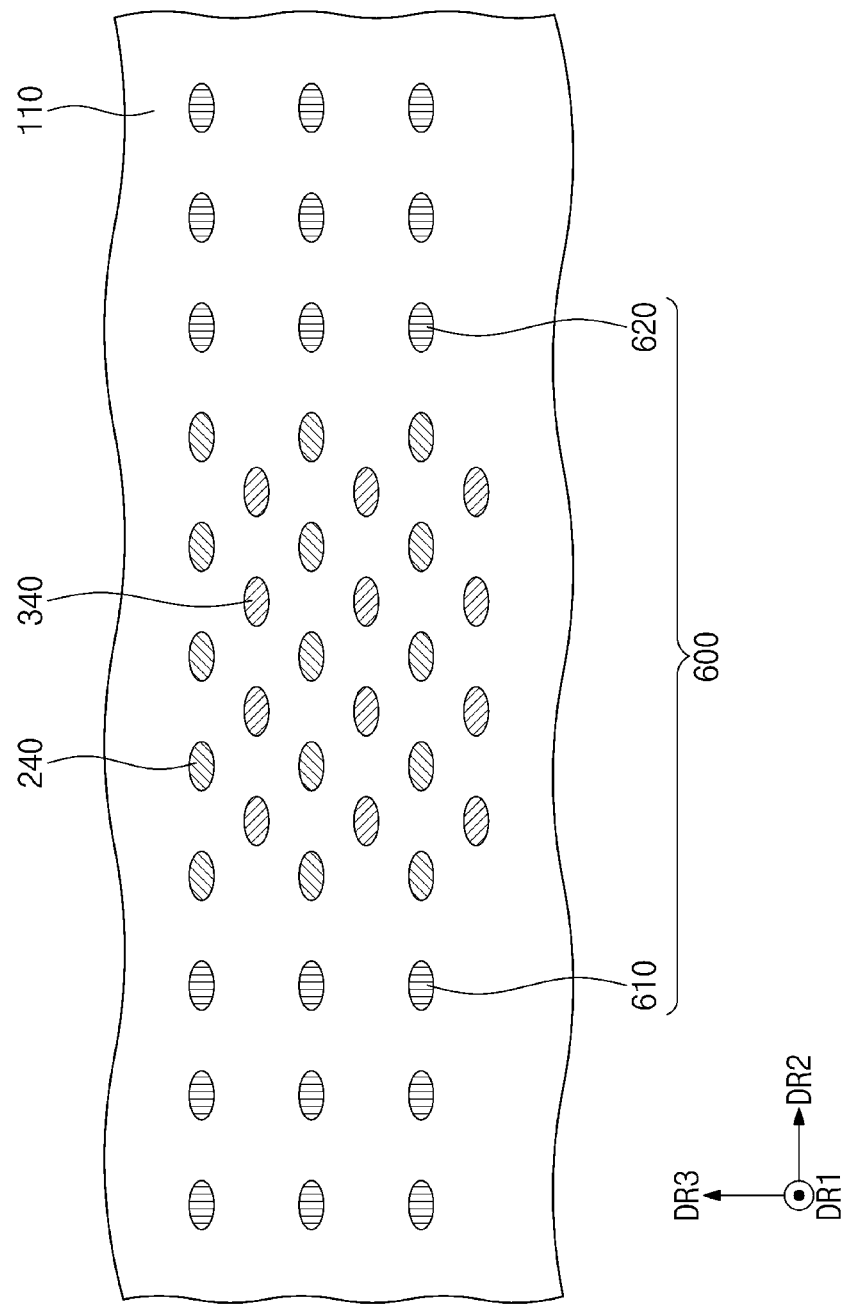
FIG. 10 is a plan view of a still further exemplary embodiment of first, second, and third reflection patterns, which are seen through the incidence surface of the electronic device of FIG. 9.

FIG. 10 is a plan view of a still further exemplary embodiment of first, second, and third reflection patterns, which are seen through the incidence surface of the electronic device of FIG. 9.

FIG. 10 illustrates the first, second, and third reflection patterns 240, 340, and 600 of FIG. 9, which are seen through the incidence surface 110. Referring to FIG. 10, the first reflection patterns 240, the second reflection patterns 340, and the third reflection patterns 600 may not overlap each other.

The second reflection patterns 340 may be disposed in a space between the first reflection patterns 240. In other words, the first reflection patterns 240 and the second reflection patterns 340 may be alternately arranged within a specific region.

The third reflection patterns 600 may include first patterns 610 and second patterns 620. The first patterns 610 may be some of the third reflection patterns 600, and the second patterns 620 may be the remaining ones of the third reflection patterns 600. The first patterns 610 and the second patterns 620 may be spaced apart from each other with the first and second reflection patterns 240 and 340 interposed therebetween. According to some exemplary embodiments, because the third reflection patterns 600 are additionally provided, the area of an image display region may be increased.

Figure 11:
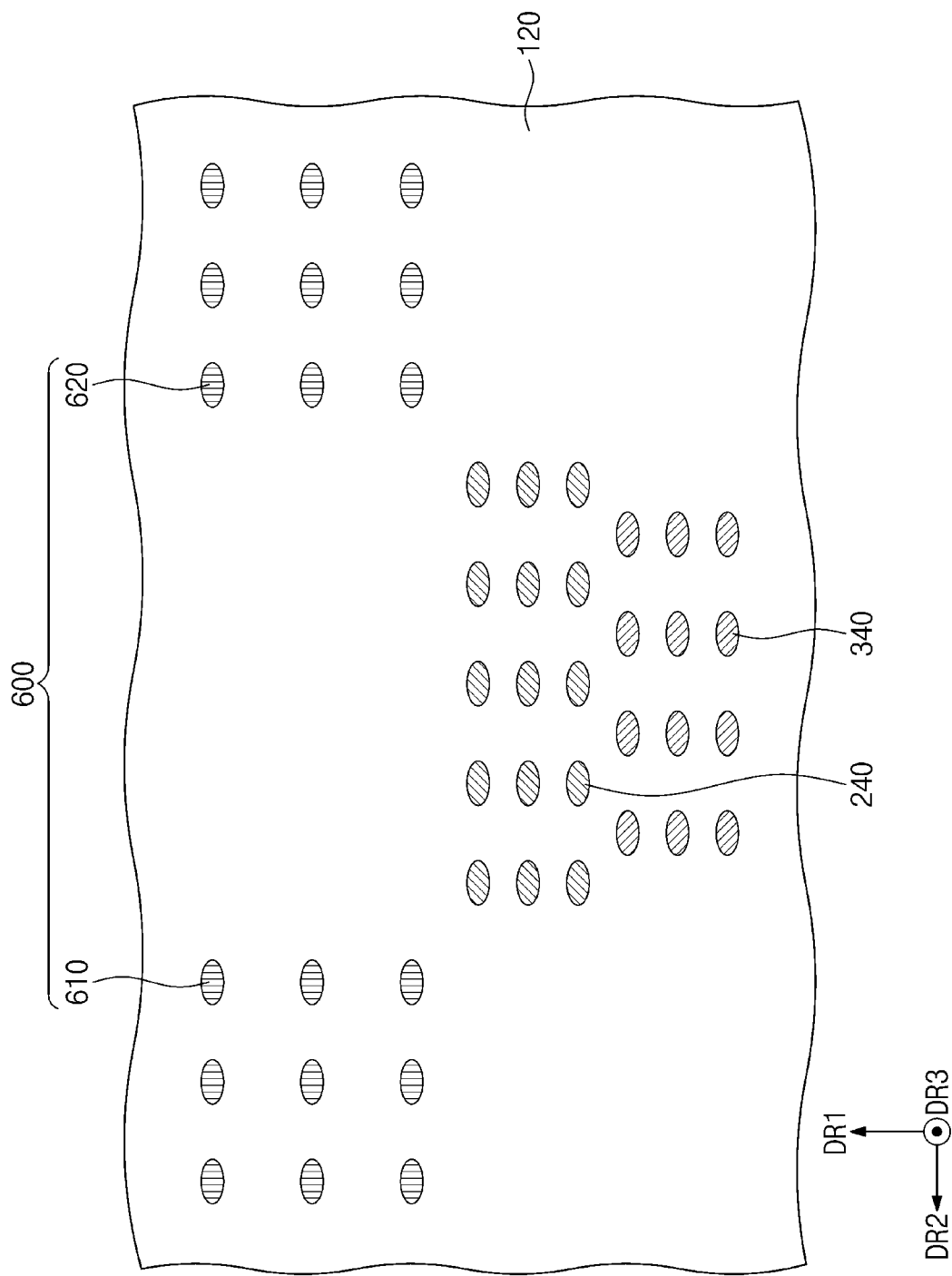
FIG. 11 is a plan view illustrating the first, second, and third reflection patterns, which are seen through the emission surface of the electronic device of FIG. 9.

FIG. 11 is a plan view illustrating the first, second, and third reflection patterns, which are seen through the emission surface of the electronic device of FIG. 9.

FIG. 11 illustrates the first, second, and third reflection patterns 240, 340, and 600 of FIG. 9, which are seen through the emission surface 120. Referring to FIG. 11, the density of the first, second, and third reflection patterns 240, 340, and 600 seen through the emission surface 120 may be less than the density of the first, second, and third reflection patterns 240, 340, and 600 seen through the incidence surface 110 (e.g., see FIG. 10). Thus, a user may easily see a real object through a region between the first, second, and third reflection patterns 240, 340, and 600.

Figure 12:
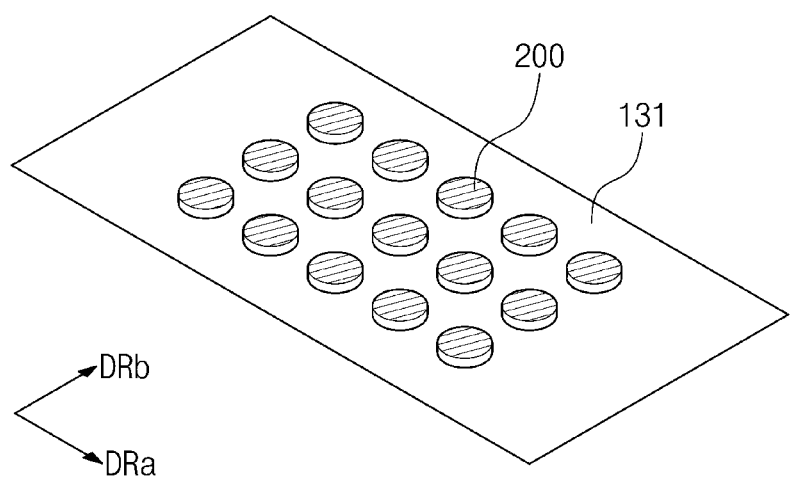
FIG. 12 is a perspective view of an exemplary embodiment of a portion of an electronic device constructed according to principles of the invention.

FIG. 12 is a perspective view of an exemplary embodiment of a portion of an electronic device constructed according to principles of the invention.

FIG. 12 exemplarily illustrates the first surface 131 and the first reflection patterns 200 disposed on the first surface 131. Referring to FIG. 12, the first surface 131 may be generally parallel to a flat surface or a plane defined by a first direction DRa and a second direction DRb. In other words, the first surface 131 may be a generally flat surface. The first reflection patterns 200 may be arranged on the first surface 131 and in the first and second directions DRa and DRb.

Figure 13:
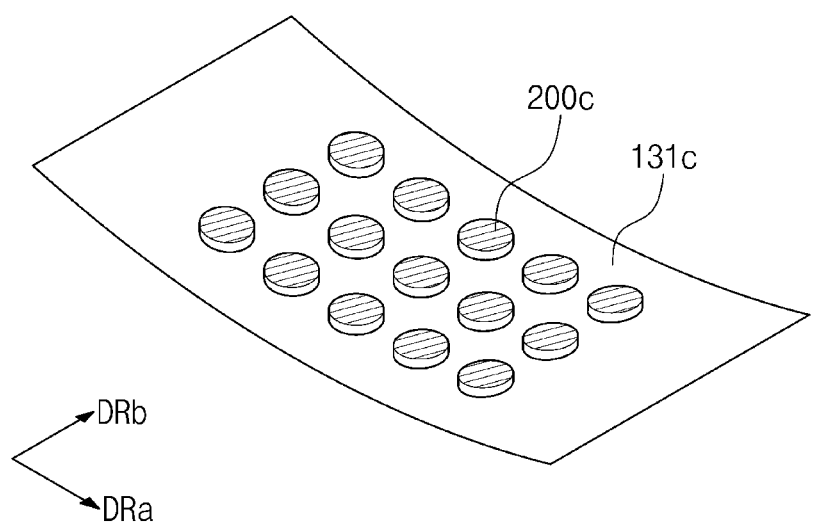
FIG. 13 is a perspective view of another exemplary embodiment of a portion of an electronic device constructed according to principles of the invention.

FIG. 13 is a perspective view of another exemplary embodiment of a portion of an electronic device constructed according to principles of the invention.

FIG. 13 exemplarily illustrates the first surface 131c and the first reflection patterns 200c disposed on the first surface 131c. Referring to FIG. 13, the first surface 131c may have a generally curved shape with respect to a plane defined by the first and second directions DRa and DRb. In other words, the first surface 131c may be a curved surface. The first surface 131c may be a generally curved surface having a finite curvature radius. The first surface 131c may have the same curvature radius in all directions, but in some exemplary embodiments, the first surface 131c may have a plurality of curvature radii.

Figure 14:
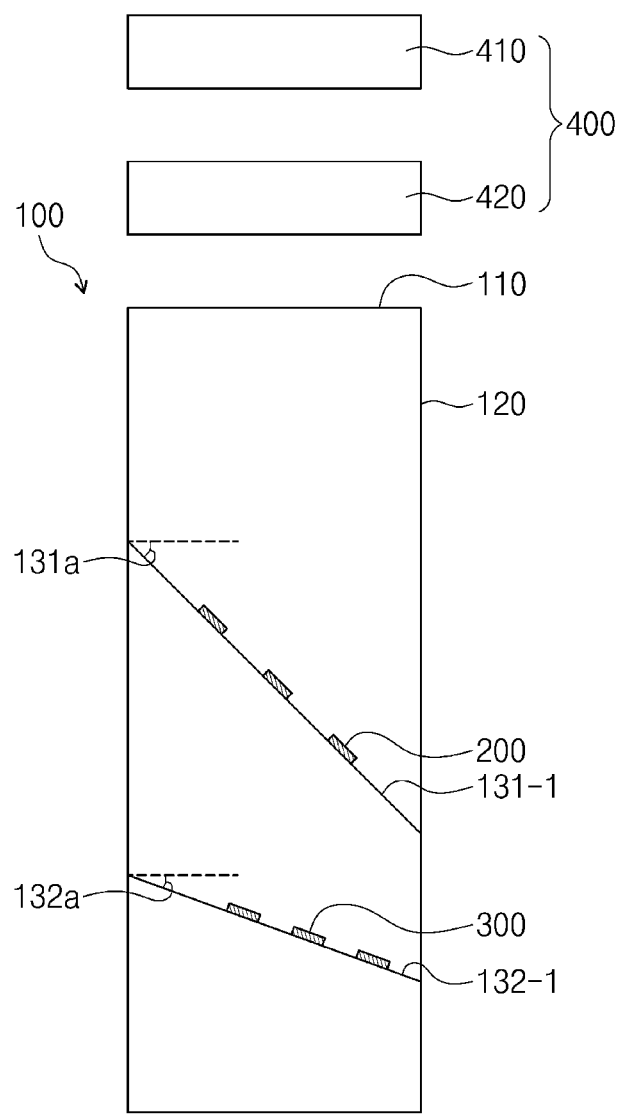
FIG. 14 is a cross-sectional view schematically illustrating another exemplary embodiment of an electronic device constructed according to principles of the invention.

FIG. 14 is a cross-sectional view schematically illustrating another exemplary embodiment of an electronic device constructed according to principles of the invention.

Referring to FIG. 14, a first surface 131-1 and a second surface 132-1 may be defined in the transmission part 100. All of the first surface 131-1 and the second surface 132-1 may be spaced apart from the incidence surface 110. The first surface 131-1 may be defined between the second surface 132-1 and the incidence surface 110.

The shortest distance between the first surface 131-1 and the incidence surface 110 may be smaller than the shortest distance between the second surface 132-1 and the incidence surface 110. In addition, the largest distance between the first surface 131-1 and the incidence surface 110 may be smaller than the shortest distance between the second surface 132-1 and the incidence surface 110. In this case, all of distances between the first reflection patterns 200 and the incidence surface 110 may be smaller than all of distances between the second reflection patterns 300 and the incidence surface 110. Thus, the first reflection patterns 200 and the second reflection patterns 300 may not overlap each other, when viewed through the emission surface 120.

Each of the first surface 131-1 and the second surface 132-1 may be inclined to the incidence surface 110 by an angle. For example, the first surface 131-1 may be inclined at a first angle 131a to the incidence surface 110, and the second surface 132-1 may be inclined at a second angle 132a to the incidence surface 110. The first angle 131a and the second angle 132a may be different from each other. For example, the first angle 131a may be greater than the second angle 132a. However, the exemplary embodiments are not limited to this example, and in at least some exemplary embodiments, the first angle 131a may be smaller than the second angle 132a.

According to the principles and exemplary embodiments of the invention reflection patterns may be disposed on a plurality of layers or surfaces. Thus, it may be possible to increase the amount of light reflected by the reflection patterns and thereby to improve the brightness of an image. In addition, since the reflection patterns are disposed on the plurality of layers or surfaces, it may be possible to increase the area of an image-displaying region. Furthermore, even when the size of the reflection patterns is reduced to realize a clear image, the brightness of the image may be compensated by increasing the number of the reflection patterns.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An electronic device, comprising:
    a light transmissive unit including an incidence surface and an emission surface oriented in two different directions, first reflectors disposed on a first surface, and second reflectors disposed on a second surface spaced apart from the first surface; and
    a display unit disposed adjacent to the incidence surface to direct light toward the first reflectors and the second reflectors;
    wherein the first reflectors and the second reflectors are offset from each other, when viewed through the incidence surface and the emission surface.

2. The electronic device of claim 1, wherein the light transmissive unit comprises a transmission part, the first reflectors comprise first reflection patterns, second reflectors comprise second reflection patterns, the display unit comprises a display part, and distances between the first reflection patterns and the incidence surface are less than distances between the second reflection patterns and the incidence surface.

3. The electronic device of claim 1, wherein the first reflectors are arranged in a first direction and a second direction intersecting the first direction,
    the second reflectors are arranged in the first direction and the second direction, and the second reflectors are not overlapped with the first reflectors.

4. The electronic device of claim 1, wherein the size of the first reflectors is different from the size of the second reflectors.

5. The electronic device of claim 1, wherein the second reflectors are disposed in a region between the first reflectors, when seen through the incidence surface.

6. The electronic device of claim 1, wherein the second reflectors are disposed below the first reflectors, when seen through the emission surface.

7. The electronic device of claim 1, wherein the first and second reflectors are disposed on a region having a first area A1 when seen through the incidence surface that is smaller than a second area of a region on which the first and second reflectors are disposed when seen through the emission surface.

8. The electronic device of claim 1, wherein the first reflectors have substantially the same size and the second reflectors have substantially the same size.

9. The electronic device of claim 1, wherein each of the first reflectors comprises first patterns, second patterns, and third patterns, which are sequentially arranged in a first direction, and
    the first patterns and the third patterns have different sizes from the size of the second patterns.

10. The electronic device of claim 9, wherein the sizes of the first and third patterns are larger than the size of the second patterns.

11. The electronic device of claim 1, further comprising third reflectors, which are disposed on a third surface defined in the light transmissive unit,
    wherein some of the third reflectors are spaced apart from others with the first and second reflectors disposed therebetween, when seen through the incidence surface.

12. The electronic device of claim 1, wherein at least one of the first and second surfaces comprises a generally flat surface.

13. The electronic device of claim 1, wherein at least one of the first and second surfaces comprises a generally curved surface having a finite curvature radius.

14. The electronic device of claim 1, wherein an angle between the first surface and the incidence surface is different from an angle between the second surface and the incidence surface.

15. The electronic device of claim 1, wherein each of the first and second reflectors comprises a metallic material.

16. The electronic device of claim 1, wherein each of the first and second reflectors have a refractive index different from a refractive index of the light transmissive unit.

17. A wearable electronic device, comprising:
 a light transmissive unit having a first surface and a second surface spaced apart from the first surface;
 first reflectors disposed on the first surface;
 second reflectors disposed on the second surface;
 a display unit disposed adjacent to the light transmissive unit in a first direction to provide light toward the first reflectors and the second reflectors; and
 a coupler configured to be directly or indirectly supported by a part of a human body, the coupler being connected to the light transmissive unit,
 wherein the first reflectors and the second reflectors are offset from each other in the first direction.

18. The wearable electronic device of claim 17, wherein the light transmissive unit comprises a transmission part, the first reflectors comprise first reflection patterns, second reflectors comprise second reflection patterns, the display unit comprises a display part, the coupler comprises a wearing part, and first reflection patterns have a size different from that of the second reflection patterns.

19. The wearable electronic device of claim 17, further comprising third reflectors disposed on a third surface defined in the light transmissive unit,
 wherein some of the third reflectors are spaced apart from others with the first and second reflectors disposed therebetween, in the first direction.

20. The wearable electronic device of claim 17, wherein the first reflectors are disposed in a region between the second reflectors, when viewed in the first direction, and
 the first reflectors are spaced apart from the second reflectors, when viewed in a second direction crossing the first direction.

* * * * *